April 22, 1958 J. MARLEY 2,831,997

ELECTRON-BEAM DEFLECTION YOKE

Filed July 27, 1955 2 Sheets-Sheet 1

April 22, 1958 J. MARLEY 2,831,997

ELECTRON-BEAM DEFLECTION YOKE

Filed July 27, 1955 2 Sheets-Sheet 2

2,831,997

ELECTRON-BEAM DEFLECTION YOKE

John Marley, Roslyn Heights, N. Y., assignor to Hazeltine Research, Inc., a corporation of Illinois Application July 27, 1955, Serial No. 524,649

12 Claims. (Cl. 313—76)

*General*

This invention is directed to electron-beam deflection yokes for effecting lateral movement of beams of electrons or similar electrical particles, and particularly to magnetic deflection yokes of this type. Yokes in accordance with the invention are particularly useful for deflecting electron beams in cathode-ray tubes of the types conventionally employed in oscilloscopes, target indicators, and most commonly used in television receivers. Since the usage in television receivers probably presents the most exacting requirements, a novel deflection yoke in accordance with the present invention will be described in that environment.

The fundamental principles underlying television transmission and reception, and the details of the apparatus employed are so well known that it is deemed unnecessary for the purpose of the invention to describe a complete television transmitter or receiver. It is well known in the art to employ cathode-ray tubes of various forms in conventional television receivers to reproduce television images. To effect such reproduction, the cathode-ray tubes include means for emitting an electron beam which is intensity modulated by video-frequency information. This beam is focused into an extremely narrow beam to provide the high definition required in reproducing the televised image, and is deflected into two orthogonal directions to scan a rectangular raster on the image screen of the picture tube to provide a two-dimensional reproduced image. Focusing of the beam is ordinarily accomplished by providing nonuniform magnetic or electric fields of regular configuration in the space traversed by the electron beam between the cathode and the image screen. Deflection of the focused electron beam is effected by developing varying electric or magnetic fields in the space traversed by the beam between the point of focusing and the image screen. The present invention is directed to deflection yokes for developing such varying magnetic deflection fields.

As is well known, a beam of electrons passing through a magnetic field is deflected in a direction perpendicular to the instantaneous direction of motion of the electrons in the beam, and to the lines of magnetic force intersected by the beam. In order to effect continuous and uniform deflection of the beam in the horizontal and vertical directions, the intensities of the components of the field in these two directions are varied, usually by employing separate coils or like configurations of conductors with their axes mutually perpendicular in which the magnitudes of the currents in the separate coils are varied independently to provide mutually perpendicular fields.

Progressive advancements in the art of television have imposed rather stringent requirements upon deflection yokes. The deflection yoke should be an efficient power converter, provide linear scanning, develop uniform deflection fields which do not cause defocusing, and be free from resonant ringing and from undesired interaction of the vertical and horizontal fields. In addition, the yoke should be inexpensive and there should be a high degree of consistency between the deflection fields developed by yokes of the same construction. With the advent of wide-angle picture tubes having deflection angles approaching 90° with an extremely short neck portion, it has become difficult to satisfy these requirements.

It has been conventional to utilize "saddle" yokes, so-called because of the saddle-like configuration of each of the four coils which combine to form the yoke. Because of the complex configuration of the coils, saddle yokes require complex winding apparatus which in spite of its complexity fails to maintain the spatial relationship of the turns in each coil uniform within a coil or from one coil to another. This failure results in field irregularities and a lack of consistency in fields developed by the same type of coils. To compensate for the field irregularities and the variations between fields developed by different coils of the same type, only a small segment at the center of the field pattern developed by a yoke used, for example, for color reproduction where precise deflection control is desired, is employed to effect deflection, the inner surfaces of the coils being spaced from the neck of the tube in order to minimize the effect of field irregularities which are strongest in the vicinity of the coil surfaces. Since only a relatively small portion of the total field developed is employed, saddle yokes tend to be expensive, large, and heavy. Additionally, they continue to develop irregular fields which undesirably affect focusing.

Toroidal yokes, which are simpler to wind, have a minimum of field irregularities and, while all yokes of the same type consistently develop similar fields, they have not been widely used because of their low efficiency and their tendency to resonate as a result of cross coupling between horizontal and vertical windings. The fields developed by the end and outer conductors of toroidal yokes, that is, by those conductors not adjacent the surface of the picture tube, consume a large percentage of the power applied to the yoke resulting in prior types of these yokes being no more than 60% as efficient as an equivalent saddle yoke.

It is the purpose of the present invention to provide a toroidal yoke which has substantially all of the desirable characteristics of both prior toroidal and prior saddle yokes to a high degree.

It is, therefore, an object of the present invention to provide a deflection yoke which does not have the deficiencies and limitations of prior such yokes.

It is a further object of the present invention to provide a deflection yoke which is more easily and inexpensively manufactured with consistent magnetic characteristics.

It is a still further object of the present invention to provide a deflection yoke with substantially uniform deflection fields with negligible magnetic components parallel to the electron-beam axis thereby minimizing defocusing.

It is also an object of the present invention to provide a deflection yoke which has a plurality of independent coils.

It is another object of the present invention to provide a deflection yoke in which the individual coils are prewound in their final shape.

It is still another object of the present invention to provide a deflection yoke in which the individual coils are of asymmetrical shape and size.

It is further an object of the present invention to provide a deflection yoke of a plurality of coils which are self-supporting.

It is also an object of the present invention to provide a deflection yoke in which the maximum length of each coil is located most effectively with respect to the neck of the picture tube.

It is still a further object of the present invention to provide a deflection yoke in which the individual coils provide a high degree of flexibility and freedom of design in assembling the yoke to develop a desired composite magnetic field.

In accordance with the present invention an electron-beam deflection yoke comprises a plurality of generally similar coils disposed about a common axis. The inner side of each of these coils includes a wide bundle of conductors generally longitudinally disposed and bent convexly longitudinally with reference to the common axis throughout at least a portion of its length. This bundle of conductors is also curved concavely laterally with respect to the axis. The end conductors of each coil are disposed generally normal to the axis, and the conductors forming the outer side of each coil are disposed generally longitudinally with reference to the axis and laterally diverging with respect to the conductors of the aforementioned inner side.

For a better understanding of the present invention, together with other and further objects thereof, reference is had to the following description taken in connection with the accompanying drawings, and its scope will be pointed out in the appended claims.

In the accompanying drawings.

*Description of electron-beam deflection yoke*

Figure 1:
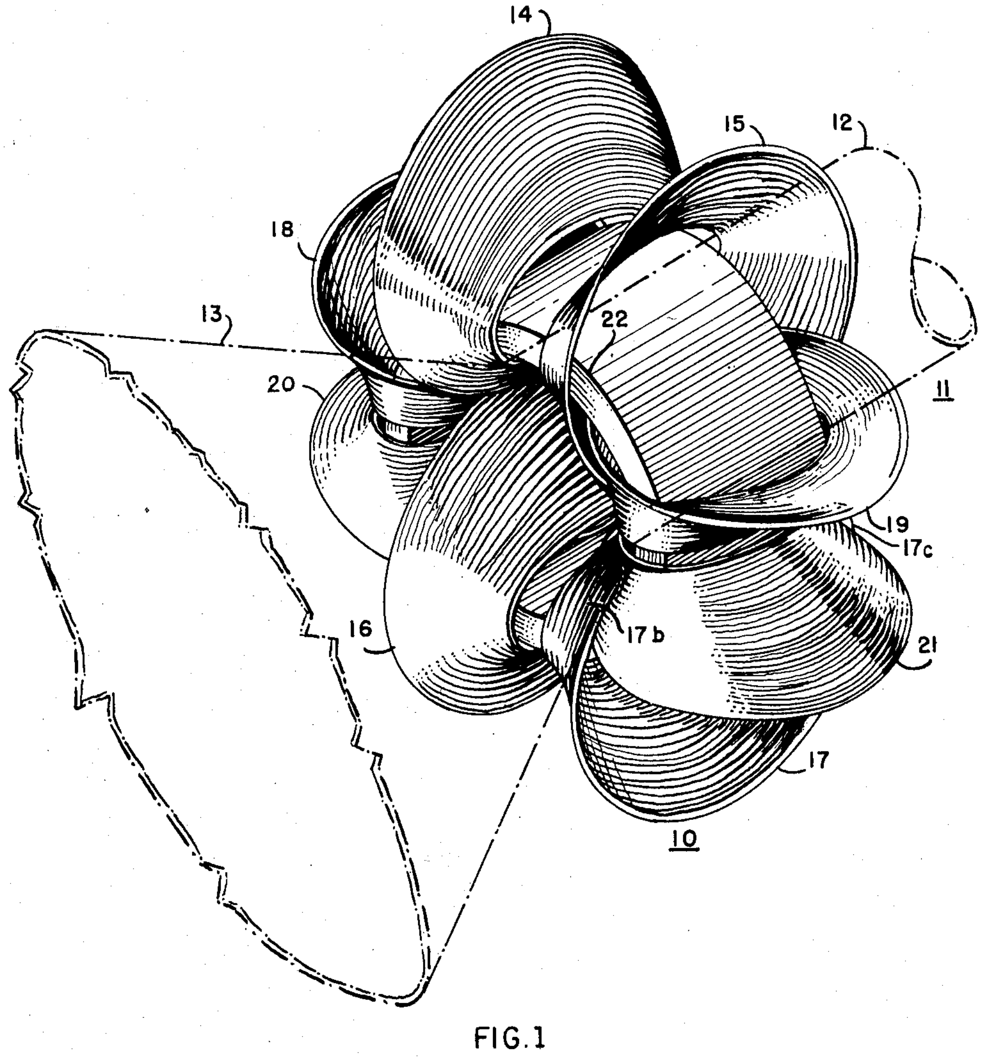
Fig. 1 is a perspective view of a toroidal deflection yoke in accordance with the present invention shown mounted on the neck of a cathode-ray tube fragmentarily represented.

In Fig. 1 a toroidal deflection yoke 10 constructed in accordance with the present invention is represented as mounted on a cathode-ray tube 11, shown in fragmentary outline. This tube may be, for example, the picture tube of a television receiver and comprises a cylindrical neck portion 12 enclosing an electron gun (not shown) for developing an electron beam, and comprises a flared portion 13 of frusto-conical shape, conventionally called the bell portion, including a fluorescent screen (not shown).

Figure 2:
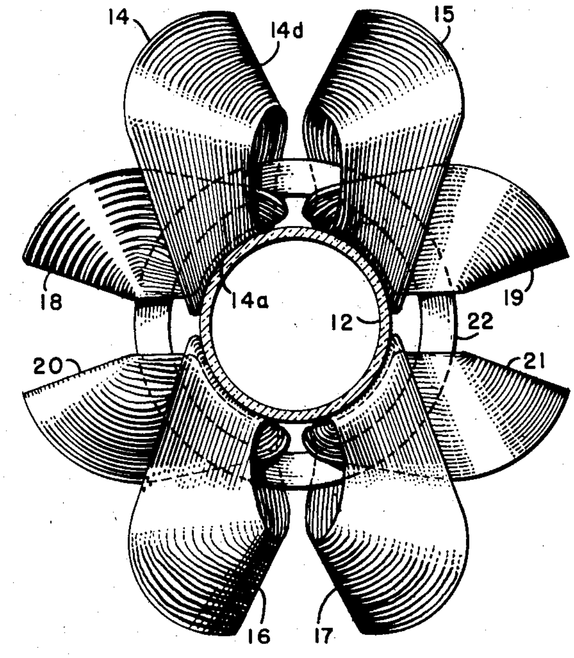
Fig. 2 is a perspective front elevation of the yoke of Fig. 1.

The yoke 10, a front view of which is represented in Fig. 2, comprises a plurality of generally similar coils, for example the eight coils identified by reference numerals 14–21, inclusive, encircling a ring-shaped core 22 of magnetic material, such as ferrite, and disposed about a common axis, that is, the axis of the core 22 which coincides with a longitudinal line at the center of the neck 12 substantially defining the undeflected path of the electron beam. Each of the coils 14–21, inclusive, is generaly of a frusto-conical shape having generally elliptical cross sections and has a center axis. The center axes of, for example, the coils 14 and 15 coincide with a horizontal line tangent to the core 22 at a point midway between the smaller ends of these coils. The center axes of different groups of the coils are in different groups of substantially parallel planes with the planes of one group orthogonal to those of another. For example, the axes of the coils in the group of coils 14–17, inclusive, comprising the horizontal deflection windings, are parallel to each other and at right angles to the parallel axes of the coils in group of coils 18–21, inclusive, comprising the vertical deflection windings. Each of the coils 14–21, inclusive, may comprise a single layer of wire, multiple layers, or a number of similar coils nested one within another. The number of wire layers used is determined by the inductance, the direct-current resistance, and the shape of the magnetic field desired. For example, a cosine type field can be obtained by the nesting of coils which vary in size with respect to each other according to a cosine law.

The inner side of each of the coils 14–21, inclusive, specifically the side adjacent and preferably in contact with the neck 12 of the tube 11, for example the side 14*a* of the coil 14, includes a wide bundle of conductors with a thickness which is a small fraction of the width and which are generally longitudinally disposed. These conductors are bent convexly longitudinally with reference to the common axis throughout a portion of their length and are curved concavely laterally with respect to the axis through an angle of less than 90°. As represented in Fig. 1, the inner side of each coil is curved concavely laterally so as to be in contact with the neck 12 for the major portion of the length of the inner side, specifically, for that portion from the rear end of the coil, that is, the end remote from the bell portion 13 to the point where the bell portion 13 and the neck 12 join. At the latter point, the wide bundle of conductors forming the inner side, while continuing to be curved concavely, is additionally bent longitudinally to form a convex surface which flares outward from the surface of the bell porton 13 of the tube. Preferably, the curvature of the flaring convex portion is determined as a function of the deflection path taken by the electron beam as it emerges from the front end of the yoke, as will be explained more fully hereinafter. Ideally, the curve would be hyperbolic, and in practice, the curve for each conductor approaches a hyperbola but deviates therefrom because of manufacturing tolerances and the restraints imposed by the integral relation of the hyperbolically curved conductors and the other parts of the coil.

The inner sides of one of the groups of coils, specifically of the coils 14–17, inclusive, forming the horizontal deflection windings, are longer than those of the group 18–21, inclusive, forming the vertical deflection windings. The inner sides of the coils 14–17, inclusive, are disposed adjacent each other around the core 22 to define generally one hyperboloid of revolution about the core axis. The inner sides of the coils 18–21, inclusive, are layered on different ones of the inner sides of the coils 14–17, inclusive, for example the inner side of coil 18 is layered on the inner side of coil 14, and are disposed adjacent each other around the core 22 to define generally another hyperboloid of revolution concentric with the one formed by the coils 14–17, inclusive.

The inner side of each coil is the only part that should contribute to the development of the desired magnetic deflection field. Ideally, if current could be made to flow only through the bundle of conductors forming this one side, at least theoretically a perfect deflection field could be obtained. The remaining parts of each coil, that is, the end conductors and the conductors forming the outer side, are necessary only for the purpose of completing the current path for the conductors forming the inner side. Therefore, ideally the remaining conductors are physically disposed relative to the conductors forming the inner side and also relative to each other in such manner as to minimize the effect of the current flowing in these remaining conductors on the magnetic field developed by the current flowing in the conductors forming the inner side.

The end conductors of the coils 14–21, inclusive, are disposed generally normal to the common axis. The end conductors at the forward end of each coil are those in that portion of the coil connecting the ends of the hyperbolically curved conductors in the inner side with the conductors forming the outer side of the coil, for example those conductors within the region indicated by the reference character 17*b* for coil 17 in Fig. 1. Ideally, these end conductors should contribute no detrimental magnetic component to the deflection field and, therefore, should be radially disposed in a plane normal to and intersecting the longitudinal axis of the yoke. However, the restraints imposed by the integral relation of these end conductors and the other conductors in each coil prevent the ideal from being fully attained. Since the beam is undeflected at the rear of the yoke, the shaping of the end conductors at the rear of each coil, for example the conductors in the region indicated by the reference character 17*c* for coil 17 in Fig. 1, is not critical. Preferably, these end conductors form a right-angle bend with the conductors forming the inner side of the coil and, as are the end conductors at the front, are radially disposed in a plane orthogonal to and intersecting the beam axis.

The conductors forming the outer side of each of the coils 14–21, inclusive, for example the side 14*d* of coil 14 in Fig. 2, form a wide bundle generally defining a plane longitudinally disposed with reference to the common axis, are spaced further from this axis than the conductors forming the inner side of each of the coils, and the plane formed by these conductors is disposed laterally at an angle approaching a radial angle with respect to the core axis. More specifically, in Figs. 1 and 2, the conductors forming the inner side of each coil are adjacent the neck of the tube, while the conductors forming the outer side thereof are spaced by the width of the coil from the neck of the tube and diverge laterally at a sharp angle with respect to the surface of the neck of the tube. It is evident that the plane of the outer side 14*d* of the coil 14 nearly coincides with an extension of a radius from the axis of the neck 12 and, thus, can be said to be at an angle approaching a radial angle with respect to the core or tube axis. Preferably, the conductors forming the outer sides of the coils 14–21, inclusive, are spaced as far away from the longitudinal axis of the tube as is possible in conformity with the other requirements of the yoke and also, preferably, as indicated by the conductors forming the outer sides of the coils 14 and 15 in Fig. 2, the conductors of the outer sides of adjacent coils should be positioned in close proximity so that the magnetic fields developed by such conductors will tend to cancel. If commercially practicable, it would be desirable to have the bundles of conductors forming the outer sides of, for example, the coils 14 and 15 in contact with each other, in order to effect perfect magnetic cancellation.

*Method of winding electron-beam deflection yoke*

The coils 14–21, inclusive, may be wound by any of well-known methods. Preferably, each coil is wound in its final form by using properly shaped formers. For example, the former may generally have the shape of a right elliptical cone with asymmetrical cross sections and a concave surface. The average slope of the surface is of the order of 30° with respect to the center axis of the cone, being limited to the maximum slope at which the wire will wind in a layer, that is, will not climb adjacent turns. The wire for each coil is wound on the former by means of a conventional coil-winding machine or by other means starting from the narrow diameter turn at the top of the cone and progressing to the largest diameter turn near the base of the cone. Though any of a number of well-known means may be employed to make the coil rigid, preferably the insulated wire being employed has a plastic coating soluble in alcohol so that the coating may be softened as the wire is applied to the former and quickly hardens to affix each turn to the prior turn. A coil so wound is self-supporting, requiring no further waxing or cementing when removed from the former.

As previously described, the four coils 14–17, inclusive, employed to effect horizontal deflection enclose a larger volume than the vertical coils in order to provide the higher energy and sensitivity required for horizontal deflection. Each of the coils 18–21, inclusive, employed for vertical deflection is formed to nest in a horizontal coil in the manner represented, for example, by the nesting of vertical coil 18 in horizontal coil 14 of Fig. 2. The coils may be assembled to form the yoke by many different means. For example, as a first step in the assembly process, the four pairs of horizontal coils with the vertical coils nested therein may be assembled with insulation material between the horizontal and vertical coils. Conventional cementing operations can be employed to affix the insulation material and the coils of each pair to each other. Then two pairs of these coils may be positioned on one half and the remaining two pairs on the other half of the ferrite core 22. The two halves of the core 22 are then joined to form a ring and the four pairs of coils permanently affixed to the core in the proper spatial relationships by any of a number of well-known processes. For example, the mounting and affixing operation may be effected by coating the core with adhesive and employing a jig which surrounds the coils to place and affix them in proper spatial relationship on the core 22 until the adhesive permanently binds them in the desired positions. If adjustments in the magnetic fields developed by the coils are desired, changes in the spatial relationships can be effected to provide such adjustments. The yoke may then be used with the coils exposed as shown in Fig. 1 or may be enclosed in a protective housing in the well-known manner for enclosing yokes.

*Explanation of operation of electron-beam deflection yoke*

Figure 3:
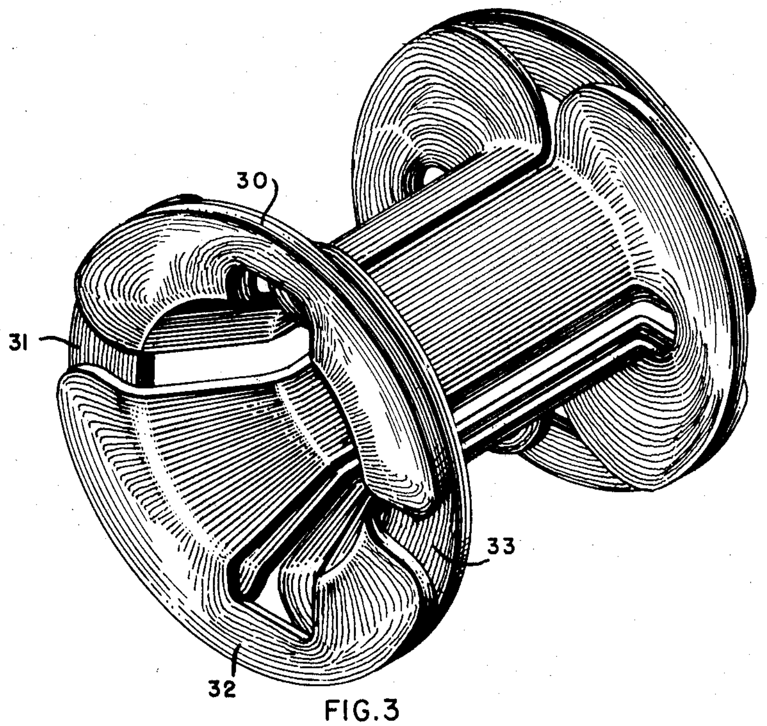
Fig. 3 is a perspective view of a saddle yoke in accordance with the prior art.

Before considering the details of the magnetic fields developed by the yoke 10 in accordance with the present invention, it is helpful to consider deflection problems generally and the deficiencies in the operation of conventional yokes such as represented by Fig. 3.

In order to utilize the available deflection energy in a yoke to the highest possible degree, the composite magnetic field produced by the yoke should be at a maximum throughout the region of the cathode-ray tube in which the deflection occurs. Consequently, certain conditions should be satisfied in order for a yoke to operate in a manner to provide the maximum deflection force on the electrons of the scanning beam at each point in the course of their journey through the deflecting region. Perhaps the principal requirement to be met is that the turns of the coil of which the yoke is formed should be so disposed with respect to each other and of such configuration that they are always in close proximity to the electrons of the electron beam. This results in the production of the highest possible magnetic field intensity at each point and, hence, the application of a maximum deflecting force to the electrons.

As the scanning beam occupies a position progressively more distant from the electron gun, it is deflected away from the axis of the cathode-ray tube at an angle which increases throughout the region bounded by the yoke and becomes a maximum at the point where the beam emerges from the influence of the magnetic field developed by the yoke. At this point the beam is closest to the windings of the horizontal and vertical deflection coils, usually being separated by not much more than the thickness of the glass wall of the tube. Since any disturbance of the electrons in the beam is most likely to occur at this point, the configuration of the coils forming the yoke is largely determined by the desired path of the electron beam at this point in its deflected path.

In designing a deflection yoke which utilizes to the fullest possible extent the applied deflection power, thereby facilitating wide angle deflection such as required in modern television picture tubes, the windings in the region where the electron beam enters the influence of the deflecting field should be in as close proximity to the scanning beam as possible without actually being interposed in the path of such beam. The proximity of the windings to the beam in this region, the number of turns in such windings, and the power supplied thereto determine the deflecting force which is exerted on the electrons in the beam. This deflecting force, in turn, determines the position occupied by the electrons in the beam at some subsequent point in their travel through the deflecting region. The latter position, in turn, determines how close the windings in this subsequent region may be placed to the beam without actually lying in the beam path. By considering the deflecting action on the beam throughout the travel of the beam through the deflecting region, it is found that the displacement of the beam from the point of entering such region to the point of exit therefrom is generally a hyperbolic function. Consequently, in order to effect the most efficient deflection for a given input power, the configuration of the windings of the yoke which effect such deflection should be generally hyperbolic. In other words, the surface of revolution defined by the windings of the yoke in the vicinity of the surface of the cathode-ray tube should be generally a hyperboloid surface of revolution.

The above defines the longitudinal configuration of the windings forming a deflection yoke to effect the highest efficiency of deflection for a given input power. There are other problems in obtaining maximum deflection of the beam without the introduction of undesired characteristics in the beam. One of the major ones of these problems is the accomplishment of highly efficient deflection without causing defocusing of the beam. Focusing is usually effected in modern television receivers by means of a focusing coil developing a magnetic field having a major component parallel to the axis of the electron beam. By means of such field, the electrons are forced to converge at the image screen into a circular spot of very minute diameter. The strength of the magnetic field to effect focusing is proportioned to cause the electrons to converge into such spot but not strong enough to cause the electrons to cross over thereby resulting in convergence which becomes divergence of the electrons and results in large spots of light on the image screen. Since the deflection yoke acts on the electron beam after the proper amount of convergence force has been applied to the electrons, any magnetic component developed by the deflection yoke which is parallel to the axis of the electron beam will tend to disturb the convergence or cause divergence and result in defocusing. Consequently, it is a further requirement of a desirable deflection yoke that it develop negligible magnetic field components parallel to the axis of the beam.

Usually the problem of defocusing caused by deflection yokes is most critical at the exit end of the yoke where the electron beam has been deflected through a wide angle and comes close to the windings of the yoke. The problem is aggravated by the need at the exit end of the yoke to provide conductors to return the current flowing through those windings of the yoke which have been employed to effect deflection. The current being returned develops magnetic fields which, if not in the proper direction or if not controlled in some manner to be made sufficiently weak, cause defocusing of the beam. The yoke designer is faced with the problem of utilizing the maximum length of windings to effect high sensitivity of deflection and still, in some manner, at the exit end of the yoke connecting the return path for the current in the desired deflection windings so that negligible defocusing will occur.

Referring now to the conventional yoke of Fig. 3, the end or return windings at the exit end of the yoke are identified by the reference numerals 30–33, inclusive. The deflection windings are the longitudinal windings to which these end windings are connected. Insofar as these deflection windings flare outward at the exit end of the yoke, remaining generally parallel to the path of the beam at this point and developing magnetic lines of flux which are at right angles to such path, they contribute highly desirable deflection energy. However, at the point where these deflection windings are bent to form the cross windings or end windings 30–33, inclusive, the field deflected by the end windings no longer adheres to the requisite that it be at all times substantially transverse to the axis of the beam but now contributes a major component which is parallel to the axis of the beam. In yokes such as represented by Fig. 3, the effect of this undesired field is minimized by positioning the cross turns 30–33, inclusive, as far away from the beam axis as possible within the limitations imposed by effecting some deflection energy from the longitudinal windings merging into such end turns. The result is a compromise in which either some defocusing is accepted in order to obtain highly sensitive deflection or the end turns are spaced at a greater distance from the electron-beam axis with the consequent loss in sensitivity.

The yoke in accordance with the present invention, as represented by Figs. 1 and 2, does not require such a compromise. Referring to Fig. 2, the coils 14–17, inclusive, are connected in series to a source of horizontal deflection current (not shown) to develop substantially parallel vertical lines of magnetic flux of a desired pattern as controlled by the shaping of the conductors forming the inner sides of these coils and by their relative spatial relationship. Similarly, the coils 18–21, inclusive, are connected in another series circuit to a source of vertical deflection current (not shown) to develop another field of substantially horizontal parallel lines of magnetic flux of a desired pattern. The end turns of both groups of coils forming the yoke are directed generally normal and preferably radially to the axis of the electron beam. Consequently, the magnetic fields developed by these end turns have negligible components parallel to the axis of the deflected electron beam and negligible defocusing occurs. Additionally, by forming the end turns so they are at least approximately radial to the axis of the electron beam, the maximum length of properly shaped longitudinal deflection windings forming the inner sides of the coils is obtained and, consequently, a high sensitivity of deflection is available.

Though the relationship of inner and end windings as just described could be obtained in prior toroidal yokes, the benefits of such relationships were outweighed by the deficiencies of prior toroidal yokes in having outer windings which undesirably developed magnetic fields. These undesirable fields not only consumed an excessive amount of the applied power but, because of cross coupling between those developed by the horizontal coils and those developed by the vertical coils, caused undesirable resonant effects in these coils. The yoke represented by Figs. 1 and 2 does not have these deficiencies. The outer windings of pairs of horizontal and pairs of vertical coils are positioned as close to one another as practicable and develop opposing fields which tend to cancel each other. For example, the field developed by the outer winding of horizontal coil 14 is opposed by the field developed by the outer winding of coil 15 and these fields are, consequently, diminished in strength resulting in a minimum waste of the applied power. Cross-coupling effects between horizontal and vertical coils are minimized by positioning the outer windings of adjacent horizontal and vertical coils as far apart from each other as practicable as indicated, for example, by the positioning of the outer windings of horizontal coil 14 with respect to those of vertical coil 18.

To summarize, the improved toroidal deflection yoke represented by Figs. 1 and 2 has coils with properly shaped inner sides of sufficient length to provide correct deflection fields with high sensitivity. The end conductors of these coils are directed radially with respect to the electron beam so as to have no magnetic component which can cause defocusing and the outer windings of these coils have opposing magnetic fields in close proximity to each other resulting in a minimum waste of the applied power and are so positioned with respect to each other that there is minimum cross coupling between horizontal and vertical coils.

Without intending to be limited thereto, a television deflection yoke of the following description has been found to provide the benefits of the invention for a 21-inch monochrome picture tube:

| | |
|---|---|
| Wire size | No. 30 Bondeaze No. 2. |
| Circumferential width of inner sides of horizontal coils as measured along concave walls from the maximum cross section to the minimum cross section | 60° of a curve having a 1.5" diameter. |
| Layers of wire in each coil | Single layer. |
| Core material | Ferrox Microgap No. 189T–1438–B201. |

The horizontal coils of a yoke formed with coils of the type just described and interconnected so as to provide an aiding instead of an opposing field in the outer windings of adjacent coils, such as coils 14 and 15 of Fig. 2, have an inductance of 5.16 millihenries and a deflection sensitivity of 3.55 inches per 400 milliamperes direct current while the same coils repositioned to procide opposing fields in the outer windings have an inductance of 3.36 millihenries and a deflection sensitivity of 3.45 inches per 400 milliamperes direct current. It is evident that considerably less power in the form of volt-amperes is required when the outer windings of adjacent coils develop opposing fields. This indicates the increase in efficiency and sensitivity of a toroidal yoke constructed in accordance with the present invention.

While there has been no consideration herein of effects such as pin cushion or barrel distortion, effects of this type may be compensated for in a conventional manner. These effects arise from the use of a flattened image screen which has a greater radius of curvature than the radius of curvature of the deflected beam. One method of compensating for these effects is the use of a cosine distribution of the windings in the deflection coils and such distribution may be used in yokes in accordance with the present invention.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. An electron-beam deflection yoke comprising: an annular core having a longitudinal center axis; and a plurality of frusto-conical coils individually encircling the core, the inner side of each of said coils including a wide bundle of conductors generally longitudinally disposed, the end conductors of each of said coils being disposed generally normal to said axis and the conductors forming the outer side of each of said coils being disposed generally longitudinally with reference to said axis and laterally diverging with respect to said conductors on said inner side.

2. An electron-beam deflection yoke comprising: an annular core having a longitudinal center axis; and a plurality of frusto-conical coils individually encircling the core, the inner side of each of said coils including a wide bundle of conductors generally longitudinally disposed and bent convexly longitudinally with reference to said axis throughout at least a portion of its length and curved concavely laterally with respect to said axis, the end conductors of each of said coils being disposed generally normal to said axis and the conductors forming the outer side of each of said coils being disposed generally longitudinally with reference to said axis and laterally diverging with respect to said conductors on said inner side.

3. An electron-beam deflection yoke comprising: an annular core having a longitudinal center axis; and a plurality of frusto-conical coils individually encircling the core with each of said coils having a center axis and the center axes of different groups of said coils being in different groups of substantially parallel planes with the planes of one group orthogonal to those of another, the inner side of each of said coils including a wide bundle of conductors generally longitudinally disposed with reference to said core axis, the end conductors of each of said coils being disposed generally normal to said core axis and the conductors forming the outer side of each of said coils being disposed generally longitudinally with reference to said core axis and laterally diverging with respect to said conductors on said inner side.

4. An electron-beam deflection yoke comprising: an annular core having a longitudinal center axis; and a plurality of frusto-conical coils individually encircling the core, the inner side of each of said coils including a wide bundle of conductors generally longitudinally disposed and bent convexly longitudinally with reference to said axis throughout at least a portion of its length and curved concavely laterally with respect to said axis, said inner sides of said coils being disposed with respect to each other to define generally a hyperboloid of revolution about said core axis, the end conductors of each of said coils being disposed generally normal to said axis and the conductors forming the outer side of each of said coils being disposed generally longitudinally with reference to said axis and laterally diverging with respect to said conductors on said inner side.

5. An electron-beam deflection yoke comprising: an annular core having a longitudinal center axis; and two groups of frusto-conical coils for developing orthogonal deflection fields, each of said coils encircling the core, the inner side of each of said coils including a wide bundle of conductors generally longitudinally disposed, said inner sides of one group of said coils being longer than those of another group of said coils and each of said coils of said other group nesting in different ones of said coils of said one group, the end conductors of each of said coils being disposed generally normal to said axis and the conductors forming the outer side of each of said coils being disposed generally longitudinally with reference to said axis and laterally diverging with respect to said conductors on said inner side.

6. An electron-beam deflection yoke comprising: an annular core having a longitudinal center axis; and a plurality of frusto-conical coils individually encircling the core, the inner side of each of said coils including a wide bundle of conductors generally longitudinally disposed, the end conductors of each of said coils being disposed generally normal to said axis and the conductors forming the outer side of each of said coils being in a wide bundle disposed generally longitudinally with reference to said axis and laterally diverging with respect to said conductors on said inner side, the outer conductors of pairs of said coils being positioned in close proximity to each other to produce cancellation of the magnetic fields developed by the outer conductors.

7. An electron-beam deflection yoke comprising: an annular core having a longitudinal center axis; and a plurality of frusto-conical coils individually encircling the core, the inner side of each of said coils including a wide bundle of conductors generally longitudinally disposed, the end conductors of each of said coils being disposed generally normal to said axis and the conductors forming the outer side of each of said coils being in a wide bundle generally defining a plane disposed longitudinally with reference to said axis and disposed laterally at an angle approaching a radial angle with respect to said axis, the planes of the outer conductors of pairs of said coils being positioned in close proximity and forming a small acute angle with respect to each other.

8. An electron-beam deflection yoke comprising: an annular core having a longitudinal center axis; and a plurality of frusto-conical coils individually encircling the core, each of said coils having a center axis with the center axes of different groups of said coils being in different groups of substantially parallel planes with the planes of one group orthogonal to those of another, the axes of both groups being orthogonal to the core axis, the inner side of each of said coils including a wide bundle of conductors with a thickness which is a small fraction of the width and generally longitudinally disposed and bent convexly longitudinally with reference to said core axis throughout at least a portion of the length of said bundle and curved concavely laterally with respect to said core axis, the inner sides of one of said groups of said coils being longer than those of another of said groups and disposed adjacent each other to define generally one hyperboloid of revolution about said core axis and the inner sides of said coils of said other group being individually layered on different ones of the inner sides of said coils of said one group and disposed adjacent each other to define generally another hyperboloid of revolution concentric with said one hyperboloid of revolution, the end conductors of each of said coils being disposed generally normal to said core axis and the conductors in the outer side of each of said coils forming a wide bundle generally defining a plane disposed longitudinally with reference to said core axis and disposed laterally at an angle approaching a radial angle with respect to said core axis, the planes of the outer conductors of pairs of said coils in the same group being in close proximity and at a small acute angle with respect to each other.

9. An electron-beam deflection yoke comprising: a ring-shaped core of magnetic material; a pluraliy of frusto-conical coils encircling said core, each of said coils having a center axis with the center axes of different groups of said coils being in different groups of substantially parallel planes with the planes of one group orthogonal to those of another, the axes of both groups being orthogonal to the core axis, the inner side of each of said coils on the inner surface of said core including a wide bundle of conductors with a thickness which is a small fraction of the width and generally longitudinally disposed and bent convexly longitudinally with reference to the axis of said core throughout at least a portion of the length of said bundle and curved concavely laterally to conform with the curvature of the inner surface of said core, the inner sides of one of said groups of said coils being longer than those of another of said groups and disposed adjacent each other around said core to define generally one hyperboloid of revolution about the axis of said core and the inner sides of said coils of said other group being individually layered on different ones of the inner sides of said coils of said one group and disposed adjacent each other around said core to define generally another hyperboloid of revolution concentric with said one hyperboloid of revolution, the end conductors of each of said coils being disposed generally normal to the axis of said core and the conductors in the outer side of each of said coils forming a wide bundle generally defining a plane disposed longitudinally with reference to said core axis and disposed laterally at an angle approaching a radial angle with respect to said core axis, the planes of the outer conductors of pairs of said coils in the same group being in close proximity and at a small acute angle with respect to each other.

10. An electron-beam deflection yoke comprising: an annular core having a longitudinal center axis; and a plurality of frusto-conical coils individually encircling the core, each of said coils having a center axis with the center axes of the group of said coils interconnected to develop a horizontal deflection field and of the group of said coils interconnected to develop a vertical deflection field being in different groups of substantially parallel planes with the planes of one group orthogonal to those of another, the axes of both groups being orthogonal to the core axis, the inner side of each of said coils including a wide bundle of conductors with a thickness which is a small fraction of the width and generally longitudinally disposed and bent convexly longitudinally with reference to said core axis throughout at least a portion of the length of said bundle and curved concavely laterally with respect to said core axis, the inner sides of the one of said groups of said coils for developing a horizontal deflection field being longer than those of the other of said groups for developing a vertical deflection field and disposed adjacent each other to define generally one hyperboloid of revolution about said core axis and the inner sides of said coils of said other group being individually layered on different ones of the inner sides of said coils of said one group and disposed adjacent each other to define generally another hyperboloid of revolution concentric with said one hyperboloid of revolution, the end conductors of each of said coils being disposed generally normal to said core axis and the conductors in the outer side of each of said coils forming a wide bundle generally defining a plane disposed longitudinally with reference to said core axis and disposed laterally at an angle approaching a radial angle with respect to said core axis, the planes of the outer conductors of pairs of said coils in the same group being in close proximity and at a small acute angle with respect to each other.

11. Picture scanning apparatus for television comprising: a cathode-ray tube; an annular core around the neck of the tube enclosed by a plurality of frusto-conical coils as follows: a horizontal scanning system comprising a pair of such coils along each of two parallel axes on opposite sides of the neck, each pair having its apices adjacent each other and one side of each coil adjacent the neck with the other sides of each pair forming a V-shaped gap with a small angle; a vertical scanning system comprising a pair of such coils along each of two parallel axes on opposite sides of the neck, each pair having its apices adjacent each other and one side of each coil adjacent the neck with the other sides of each pair forming a V-shaped gap with a small angle; all the coils having their sides adjacent the neck formed to fit the cylindrical contour of the neck; each coil of the vertical system nesting with one coil of the horizontal system in such manner that their so formed sides overlap and their apices are on opposite sides of the so overlapping portion; and the coils being so connected that magnetic fields of the other sides of each pair of coils cancel each other.

12. A magnetic deflection yoke comprising: an annular core; and a plurality of coils individually encircling the core, the coils being interconnected to that current will flow in opposite directions in different ones of the coils, the coils being positioned around the core so that current flow in the coil portions inside the core will develop a deflection field within the core, the outer portions of neighboring coils carrying current in opposite directions being displaced toward one another to produce cancellation of the magnetic fields which these coil portions outside the core tend to establish thereby to decrease the energy loss of the yoke.

References Cited in the file of this patent

UNITED STATES PATENTS

| | | |
|---|---|---|
| 2,108,523 | Bowman-Manifold | Feb. 15, 1938 |
| 2,229,977 | Kenyon | Jan. 28, 1941 |
| 2,570,425 | Bocciarelli | Oct. 9, 1951 |
| 2,645,735 | Wendzel | July 14, 1953 |